(12) United States Patent
Li et al.

(10) Patent No.: US 11,985,428 B2
(45) Date of Patent: May 14, 2024

(54) GPS COORDINATES-BASED TARGET OVERALL PLANNING METHOD AND CAMERA

(71) Applicant: Hangzhou Hikvision Digital Technology Co., Ltd., Hangzhou (CN)

(72) Inventors: Yong Li, Hangzhou (CN); Haishan Jin, Hangzhou (CN); Wei Wang, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 445 days.

(21) Appl. No.: 17/287,659

(22) PCT Filed: Nov. 18, 2019

(86) PCT No.: PCT/CN2019/119244
§ 371 (c)(1),
(2) Date: Apr. 22, 2021

(87) PCT Pub. No.: WO2020/114232
PCT Pub. Date: Jun. 11, 2020

(65) Prior Publication Data
US 2021/0349221 A1    Nov. 11, 2021

(30) Foreign Application Priority Data

Dec. 6, 2018 (CN) .......................... 201811485122.9

(51) Int. Cl.
*G01S 19/48* (2010.01)
*H04N 7/18* (2006.01)
*H04N 23/698* (2023.01)
(52) U.S. Cl.
CPC ........... *H04N 23/698* (2023.01); *H04N 7/181* (2013.01)

(58) Field of Classification Search
CPC ............................. H04N 23/698; H04N 7/181
See application file for complete search history.

(56) References Cited

U.S. PATENT DOCUMENTS

| 7,692,684 B2 | 4/2010 | Ku et al. |
| 8,577,083 B2 * | 11/2013 | Kirk ....................... G01C 11/06 382/103 |

(Continued)

FOREIGN PATENT DOCUMENTS

| CN | 101303727 A | 11/2008 |
| CN | 101320427 A | 12/2008 |

(Continued)

OTHER PUBLICATIONS

International Search Report issued in PCT/CN2019/119244, dated Feb. 27, 2020, 7 pages.

(Continued)

*Primary Examiner* — Gregory M Desire
(74) *Attorney, Agent, or Firm* — Meunier Carlin & Curfman LLC (57) ABSTRACT

Provided are a GPS coordinates-based target overall planning method and a camera. Said method comprises: acquiring the GPS coordinates of each tracking target (S101); for each pre-divided region, counting the number of tracking targets located in the region based on the acquired GPS coordinates of each tracking target (S102); generating a heat map of the tracking targets based on the number of the tracking targets in each region (S103). Hence, in the present method, a device generates a heat map based on the GPS coordinates of tracking targets, and the heat map can reflect the number of the tracking targets in each region, achieving the overall planning of the tracking targets.

13 Claims, 5 Drawing Sheets

(56) References Cited

U.S. PATENT DOCUMENTS

| | | | |
|---|---|---|---|
| 9,620,168 B1* | 4/2017 | Townsend | G06T 7/90 |
| 10,080,129 B2* | 9/2018 | Seidman | H04W 4/029 |
| 10,268,919 B1* | 4/2019 | Piekniewski | H04N 9/7973 |
| 10,281,554 B2* | 5/2019 | Wang | G05D 1/0094 |
| 10,386,188 B2* | 8/2019 | Tian | G05D 1/106 |
| 10,592,750 B1* | 3/2020 | Yavagal | H04N 23/633 |
| 10,747,997 B2* | 8/2020 | Janniello | B64C 39/024 |
| 10,788,235 B2* | 9/2020 | Shionozaki | B25J 9/1694 |
| 10,901,094 B2* | 1/2021 | Koontz | G01S 3/20 |
| 11,010,726 B2* | 5/2021 | Sueyoshi | G06Q 30/0609 |
| 11,039,044 B2* | 6/2021 | Kniffen | H04N 5/144 |
| 11,470,280 B2* | 10/2022 | Li | H04N 7/18 |
| 2018/0211116 A1 | 7/2018 | Modi et al. | |

FOREIGN PATENT DOCUMENTS

| | | |
|---|---|---|
| CN | 103578109 A | 2/2014 |
| CN | 104504401 A | 4/2015 |
| CN | 105072414 A | 11/2015 |
| CN | 105407278 A | 3/2016 |
| CN | 106708955 A | 5/2017 |
| CN | 107256225 A | 10/2017 |
| CN | 107578368 A | 1/2018 |
| CN | 108174054 A | 6/2018 |
| CN | 108206935 A | 6/2018 |
| EP | 0603908 A2 | 12/1993 |
| EP | 3270585 A1 | 12/2015 |

OTHER PUBLICATIONS

Second Office Action in the priority CN application No. 201811485122. 9, dated Mar. 21, 2022.

Yu Yang, Yana Zhang, et al., "Digital TV Studio Technology" (2017).

Office Action dated Jan. 20, 2023 in related CN application No. 201811485122.9.

Extended European Search Report in Application No. 19892928.3, dated Oct. 7, 2021.

First Office Action issued in Chinese Application No. 201811485122. 9, dated Aug. 18, 2021, 9 pages.

* cited by examiner

GPS COORDINATES-BASED TARGET OVERALL PLANNING METHOD AND CAMERA

The present application claims the priority to a Chinese patent application No. 201811485122.9 filed with the China National Intellectual Property Administration on Dec. 6, 2018 and entitled "GPS coordinates-based target overall planning method, apparatus and device", which is incorporated herein by reference in its entirety.

TECHNICAL FIELD

This application relates to the technical field of security, and in particular to a GPS coordinates-based target overall planning method and a camera.

BACKGROUND

In some scenes, tracking targets such as vehicles and people can be tracked through monitoring images captured by cameras. A tracking solution may include: detecting a tracking target to be tracked in the $N^{th}$ frame image; determining positions of the tracking target in the $N+1^{th}$ frame image and subsequent images through a target tracking algorithm; converting the positions to GPS (Global Positioning System) coordinates. In this way, the GPS coordinates of the tracking target can be continuously acquired, realizing the tracking of the tracking target.

In a larger region, there are usually a large number of tracking targets, and multiple cameras are required to track these tracking targets. But at present, there is no solution for the overall planning of these tracking targets.

SUMMARY

The embodiments of this application provide a GPS coordinates-based target overall planning method and a camera, for the overall planning of the tracking targets.

An embodiment of this application provides a GPS coordinates-based target overall planning method, including:
  acquiring GPS coordinates of each tracking target;
  for each pre-divided region, counting the number of tracking targets located in the region based on the acquired GPS coordinates of each tracking target; and generating a heat map of the tracking targets based on the number of the tracking targets in each region.

In an embodiment, acquiring the GPS coordinates of each tracking target comprises:
  receiving a monitoring image sent by each camera, identifying the tracking target in the monitoring image, and converting coordinates of the tracking target from a coordinate system of the monitoring image into the GPS coordinates;
  or, receiving a data packet sent by each camera, wherein the data packet comprises the GPS coordinates of each tracking target.

In an embodiment, converting coordinates of the tracking target from the coordinate system of the monitoring image into the GPS coordinates comprises:
  selecting, from preset calibration point groups, a calibration point group whose distance to the tracking target meets a preset distance condition, as a target calibration point group; and
  converting the coordinates of the tracking target from the coordinate system of the monitoring image into the GPS coordinates based on a homography matrix, acquired in advance through calibration, for the target calibration point group.

In an embodiment, acquiring the GPS coordinates of each tracking target comprises:
  acquiring PT coordinates of a dome camera when the dome camera shoots the tracking target, and taking the PT coordinates as a first P coordinate and a first T coordinate;
  determining a horizontal included angle between the tracking target and a specified direction based on the first P coordinate;
  calculating a horizontal distance between the tracking target and the dome camera based on the first T coordinate and height of the dome camera;
  calculating a distance in a longitude direction and a distance in a latitude direction between the tracking target and the dome camera through a trigonometric function, based on the horizontal included angle and the horizontal distance; and
  calculating the GPS coordinates of the tracking target, based on a longitude and a latitude of the dome camera and the distance in the longitude direction and the distance in the latitude direction.

In an embodiment, the method further comprises:
  acquiring a time stamp for the GPS coordinates of each tracking target;
  counting the number of the tracking targets located in the region based on the acquired GPS coordinates of each tracking target, comprises:
  counting the number of the tracking targets located in the region during each time period based on the acquired GPS coordinates of each tracking target and the time stamp for the acquired GPS coordinates of each tracking target; and
  generating the heat map of the tracking targets based on the number of the tracking targets in each region, comprises:
  generating the heat map of the tracking targets based on the number of the tracking targets in each region during each time period.

In an embodiment, the method further comprises:
  acquiring attribute information of each tracking target;
  generating the heat map of the tracking targets based on the number of the tracking targets in each region, comprises:
  generating the heat map of the tracking targets, wherein the heat map comprises the number of the tracking targets in each region and the attribute information of each tracking target.

In an embodiment, the method further comprises:
  converting the acquired GPS coordinates of each tracking target into coordinates in a panoramic image according to a predetermined conversion relationship between a GPS coordinate system and a coordinate system of the panoramic image; wherein the panoramic image comprises each region; and
  superimposing and displaying each tracking target in the panoramic image acquired in advance based on the converted coordinates in the panoramic image.

In an embodiment, the panoramic image is: a map including each region, or an image captured by a panoramic camera covering each region, or an image acquired by stitching monitoring images captured by cameras in each region.

In an embodiment, generating the heat map of the tracking targets based on the number of the tracking targets in each region, comprises:

for each pre-divided region, determining a color for the region based on the number of the tracking targets located in the region; and generating the heat map of the tracking targets, wherein the heat map includes the number of the tracking targets in each region, wherein the number of the tracking targets in each region is displayed in the color for the region.

In an embodiment, after counting, for each pre-divided region, the number of the tracking targets located in the region based on the acquired GPS coordinates of each tracking target, the method further comprises:

if the number of the tracking targets located in the region is greater than a first preset threshold, increasing any one or more of the following parameters of a camera monitoring the region: resolution, a bit rate, a frame rate, and an encoding rate;

and/or, if the number of the tracking targets located in the region is less than a second preset threshold, decreasing any one or more of the following parameters of the camera monitoring the region: resolution, a bit rate, a frame rate, and an encoding rate.

In an embodiment, after counting, for each pre-divided region, the number of the tracking targets located in the region based on the acquired GPS coordinates of each tracking target, the method further comprises:

if the number of the tracking targets located in the region is greater than a third preset threshold, detecting the monitoring images captured by cameras in the region to determine whether an abnormal event has occurred; and if the abnormal event has occurred, outputting an alarm message.

In an embodiment, after counting, for each pre-divided region, the number of tracking targets located in the region based on the acquired GPS coordinates of each tracking target, the method further comprises:

if the number of the tracking targets located in the region is greater than a fourth preset threshold, controlling a panoramic camera for the region to capture an image of the region; and acquiring a panoramic image captured by the panoramic camera for the region.

In an embodiment, acquiring PT coordinates of the dome camera when the dome camera shoots the tracking target, and taking the PT coordinates as a first P coordinate and a first T coordinate, comprises:

acquiring image coordinates of the tracking target in an image captured by the dome camera; and determining the PT coordinates of the dome camera when the dome camera is facing the tracking target based on the image coordinates and a field of view of the dome camera when the dome camera shoots the tracking target, and taking the PT coordinates as the first P coordinate and the first T coordinate;

wherein the method further comprises:

sending the first P coordinate and the first T coordinate to the doom camera; and acquiring a monitoring image captured by the dome camera after the shooting angle of the dome camera is adjusted according to the first P coordinate and the first T coordinate.

An embodiment of the present application provides a camera comprising a processor and a memory;

wherein the memory is configured for storing computer programs; and the processor is configured for implementing any one of GPS coordinates-based target overall planning methods when executing the programs stored on the memory.

In the embodiments of this application, GPS coordinates of each tracking target are acquired; for each pre-divided region, the number of tracking targets located in the region is counted based on the acquired GPS coordinates of each tracking target; and a heat map of the tracking targets is generated based on the number of the tracking targets in each region. It can be seen in the present solution, the heat map can be generated based on the GPS coordinates of tracking targets, and the heat map can reflect the number of the tracking targets in each region, thus achieving the overall planning of the tracking targets.

It should be understood that any product or method for implementing the embodiments of the present disclosure does not necessarily require all of the advantages described above.

BRIEF DESCRIPTION OF THE DRAWINGS

In order to more clearly describe the technical solution of the embodiments of the application or of the prior arts, drawings needed in the embodiments and the prior arts will be briefly described below. Obviously, the drawings described below are only some embodiments of the present application, those skilled in the art can also obtain other drawings based on these drawings without any creative efforts.

FIG. 2(*a*) is a schematic diagram of calibration points in an embodiment of the present application;

FIG. 2(*b*) is another schematic diagram of calibration points in an embodiment of the present application;

DETAILED DESCRIPTION

The technical solution of embodiments of the application will be described clearly and completely with reference to the drawings in the embodiments of the present application. Obviously, the embodiments described herein are only some instead of all of the embodiments of the present application. All other embodiments obtained by those of ordinary skills in the art based on the embodiments herein without any creative efforts are within the scope of the present application.

In order to solve the above technical problems, embodiments of the present application provide a GPS coordinates-based target overall planning method and a camera. The method may be applied to various electronic devices, such as mobile phones, computers, cameras, servers, etc., which are not specifically limited. First, the GPS coordinates-based target overall planning method according to an embodiment of the present application is described in more detail below. The GPS coordinates-based target overall planning method according to the embodiment of the present application is a statistical method for counting the number of the tracking targets. For the convenience of description, the following content is described by using a server as an executive body for example.

Figure 1:
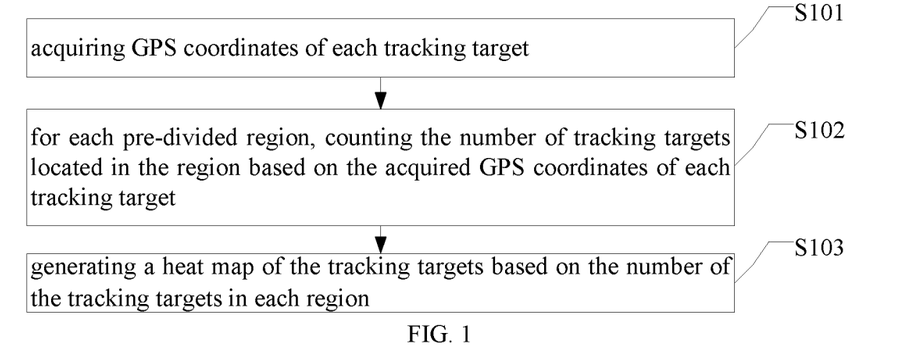
FIG. 1 is a schematic flow chart of a GPS coordinates-based target overall planning method according to an embodiment of the present application.

FIG. 1 is a schematic flow chart of a GPS coordinates-based target overall planning method according to an embodiment of the present application, including the followings.

At step S101, GPS coordinates of each tracking target are acquired.

For example, a tracking target may be a vehicle, a person, etc., which is not specifically limited.

In an embodiment, a camera may detect whether a monitoring image captured by the camera itself contains the tracking target, and if so, the GPS coordinates of the tracking target are acquired, and a data packet including the GPS coordinates is sent to a server. In this case, the server receives the data packet sent by each camera, and reads the GPS coordinates of each tracking target from the received data packet.

In another embodiment, a camera may send the monitoring image captured by the camera itself only to the server. In this case, the server receives the monitoring image sent by each camera, identifies the tracking target in the monitoring image, and converts the coordinates of the tracking target from a coordinate system of the monitoring image into the GPS coordinates.

In this embodiment, the server converting the coordinates of the tracking target from the coordinate system of the monitoring image into the GPS coordinates, may include: selecting, from preset calibration point groups, a calibration point group whose distance to the tracking target meets a preset distance condition, as a target calibration point group; converting the coordinates of the tracking target from the coordinate system of the monitoring image into the GPS coordinates based on a homography matrix, acquired in advance through calibration, for the target calibration point group.

In this embodiment, a calibration process may be performed in advance. That is, the calibration process is performed first, and then the process of determining the GPS coordinates of tracking targets is performed. The calibration process is a process of implementing calibration for each calibration point group to acquire a homography matrix, including:

acquiring a calibration image, the acquisition of the calibration image and the monitoring image is performed for a same scene; setting a plurality of calibration point groups in the calibration image; calculating a homography matrix for each calibration point group based on the image coordinates of each calibration point within the calibration point group in the calibration image, and the GPS coordinates of each calibration point within the calibration point group in a GPS coordinate system.

In order to distinguish in the description, an image acquired in the calibration process is called a calibration image, and an image acquired in the process of determining the GPS coordinates of the target is called a monitoring image. In this embodiment, the position and angle of the camera can be considered as fixed, and the calibration image and the monitoring image are captured by the camera for the same scene. Therefore, the calibration point exists in both the calibration image and the monitoring image. In other words, the coordinate system of the calibration image and the coordinate system of the monitoring image may be regarded as the same image coordinate system.

In the embodiment of the present application, a plurality of calibration point groups are preset, and each calibration point group includes at least four non-collinear calibration points. In one case, the angle between any three of these four calibration points is less than 150 degrees. The image coordinates in the image coordinate system and the GPS coordinates of each calibration point are acquired. A homography matrix may be solved based on the image coordinates and the GPS coordinates of the four calibration points in the calibration point group for each calibration point group. In other words, each calibration point group respectively corresponds to a homography matrix, and the homography matrix may represent a mapping relationship between the image coordinate system and the GPS coordinate system.

Generally, a homography matrix may be solved based on the image coordinates and the GPS coordinates of the calibration points in the calibration point group. The calibration point group may include 4 calibration points or may include more than 4 calibration points. If the calibration point group includes more than 4 calibration points, 4 calibration points may be arbitrarily selected from the more than 4 calibration points so as to obtain the homography matrix.

Specifically, the homography matrix is a 3×3 matrix with 9 parameters in total. For example, the homography matrix is:

$$H = \begin{bmatrix} h_{11} & h_{12} & h_{13} \\ h_{21} & h_{22} & h_{23} \\ h_{31} & h_{32} & h_{33} \end{bmatrix}.$$

However, since homogeneous coordinates are used in the solution process, which is scale-invariant, only 8 parameters are required to be solved.

It is assumed that the image coordinates of a calibration point are $(u_1, v_1)$ and the GPS coordinates are $(u_2, v_2)$, there is a homogeneous relationship:

$$\begin{cases} u_1 = \dfrac{u'_1}{w_1} \\ v_1 = \dfrac{v'_1}{w_1} \end{cases} \begin{cases} u_2 = \dfrac{u'_2}{w_2} \\ v_2 = \dfrac{v'_2}{w_2} \end{cases}.$$

Wherein, $w_1$ and $w_2$ are intermediate quantities. According to the homogeneous relationship, the homography conversion relation may be listed:

$$\begin{bmatrix} u'_2 \\ v'_2 \\ w_2 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} u'_1 \\ v'_1 \\ w_1 \end{bmatrix}.$$

h33 in the above homography conversion relation is extracted as a factor to get:

$$\begin{bmatrix} u'_2 \\ v'_2 \\ w_2 \end{bmatrix} = h_{33} \begin{bmatrix} \frac{h_{11}}{h_{33}} & \frac{h_{12}}{h_{33}} & \frac{h_{13}}{h_{33}} \\ \frac{h_{21}}{h_{33}} & \frac{h_{22}}{h_{33}} & \frac{h_{23}}{h_{33}} \\ \frac{h_{31}}{h_{33}} & \frac{h_{32}}{h_{33}} & \frac{h_{33}}{h_{33}} \end{bmatrix} \begin{bmatrix} u'_1 \\ v'_1 \\ w_1 \end{bmatrix} = \begin{bmatrix} h'_{11} & h'_{12} & h'_{13} \\ h'_{21} & h'_{22} & h'_{23} \\ h'_{31} & h'_{32} & h'_{33} \end{bmatrix} \begin{bmatrix} h_{33} u'_1 \\ h_{33} v'_1 \\ h_{33} w_1 \end{bmatrix}.$$

Then, an expansion relation between the image coordinates ($u_1$, $v_1$) and the GPS coordinates ($u_2$, $v_2$) is derived:

$$\begin{cases} u_2 = \frac{u'_2}{w_2} = \frac{h_{33} h'_{11} u'_1 + h_{33} h'_{12} v'_1 + h_{33} h'_{13} w_1}{h_{33} h'_{31} u'_1 + h_{33} h'_{32} v'_1 + h_{33} w_1} \times \frac{1}{w_2} \\ v_2 = \frac{u'_2}{w_2} = \frac{h_{33} h'_{21} u'_1 + h_{33} h'_{22} v'_1 + h_{33} h'_{23} w_1}{h_{33} h'_{31} u'_1 + h_{33} h'_{32} v'_1 + h_{33} w_1} \times \frac{1}{w_2} \\ u_1 = \frac{h_{33} u'_1}{h_{33} w_1} = \frac{u'_1}{w_1} \\ v_1 = \frac{h_{33} v'_1}{h_{33} w_1} = \frac{v'_1}{w_1} \end{cases}$$

The expansion relation above is simplified to get:

$$\begin{cases} u_2 = \frac{h'_{11} u'_1 + h'_{12} v'_1 + h'_{13}}{h'_{31} u'_1 + h'_{32} v'_1 + 1} \\ v_2 = \frac{h'_{21} u'_1 + h'_{22} v'_1 + h'_{23}}{h'_{31} u'_1 + h'_{32} v'_1 + 1} \\ u_1 = u'_1 \\ v_1 = v'_1 \end{cases}.$$

($u_1$, $v_1$) is substituted into ($u_2$, $v_2$) to get:

$$\begin{cases} u_2 = \frac{h'_{11} u_1 + h'_{12} v_1 + h'_{13}}{h'_{31} u_1 + h'_{32} v_1 + 1} \\ v_2 = \frac{h'_{21} u_1 + h'_{22} v_1 + h'_{23}}{h'_{31} u_1 + h'_{32} v_1 + 1} \end{cases}.$$

It can be seen that 2 calculation formulas can be listed for each calibration point, 8 calculation formulas can be listed for 4 calibration points, that is, 8 unknowns can be solved, so that the homography matrix can be solved.

In one case, a plurality of calibration points may be set in the calibration image, and every 4 non-collinear calibration points from the plurality of calibration points are combined into a calibration point group.

Figure 2A:
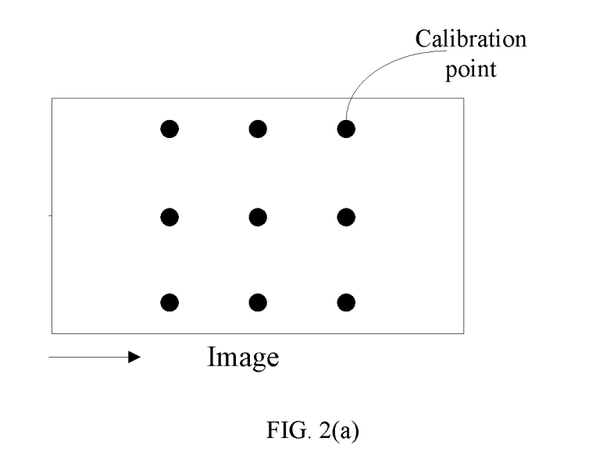
Figure 2B:
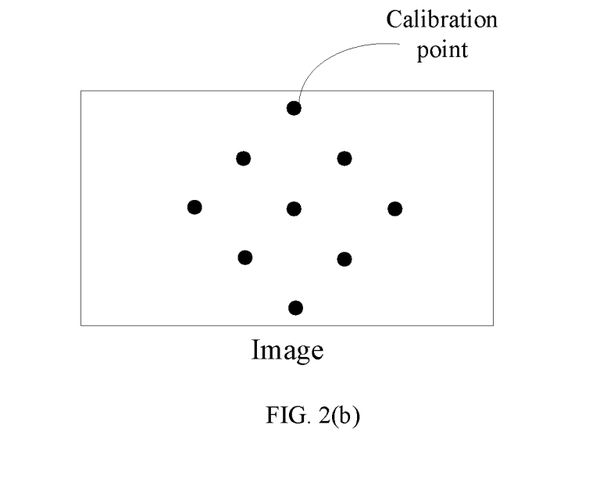

For example, when calibration points are set in the calibration image, calibration points with full coverage and uniformity may be set. As shown in FIG. 2(a) and FIG. 2(b), 9 calibration points may be set, and every 4 non-collinear points out of these 9 calibration points are combined into a calibration point group, that is, $C_9^4$ calibration point groups are obtained. A homography matrix is solved for each calibration point group, then a number of $C_9^4$ homography matrices are obtained.

As mentioned above, there is a one-to-one correspondence between pixels in the calibration image and pixels in the monitoring image. The calibration point exists in the calibration image, and there is a pixel group for the calibration point in the monitoring image. Therefore, the image distance between the tracking target and the pixel group may be determined in the monitoring image. In one case, the image distance may be the Euclidean distance or the Mahalanobis distance, which is not specifically limited. The preset distance condition mentioned in this embodiment may be that the image distance to the tracking target is the smallest, or the image distance to the tracking target is the second smallest, or the image distance to the tracking target is less than a preset threshold, which is not specifically limited.

Figure 3:
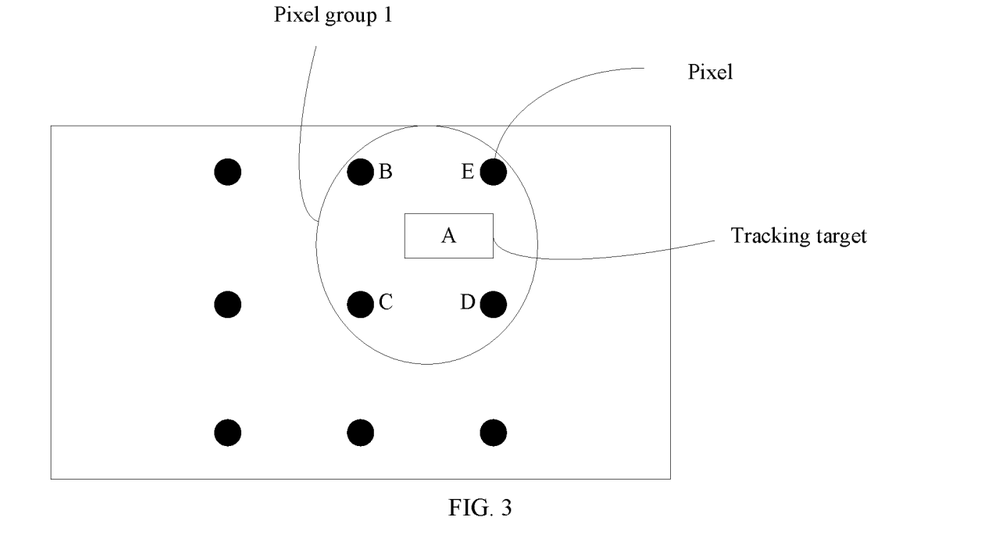
FIG. 3 is a schematic diagram of selecting a calibration point group in an embodiment of the present application.

For example, the image distance between the pixel group and the tracking target may be a sum of distances between pixels in the pixel group and the center point of the tracking target. Referring to FIG. 3, the position of the center point of the tracking target is A, and pixel group 1 includes 4 pixels. The positions of these 4 pixels are B, C, D, and E respectively. Then the image distance between pixel group 1 and the tracking target may be the sum of the distance between A and B, the distance between A and C, the distance between A and D and the distance between A and E.

There are 9 pixels and $C_9^4$ pixel groups in FIG. 3. It is assumed that the preset distance condition is that the image distance to the tracking target is the smallest, then the pixel group selected in FIG. 3 is the pixel group 1.

As mentioned above, a homography matrix is solved in advance based on each calibration point group, and the homography matrix may be understood as the mapping relationship between the image coordinate system and the GPS coordinate system. Therefore, based on the homography matrix of the target calibration point group, the coordinates of the tracking target in the monitoring image may be converted into the GPS coordinates.

In another embodiment, S101 may include: acquiring the PT (Pan/Tilt, Pan/Tilt platform moving left and right/up and down) coordinates of a dome camera when the dome camera shoots the tracking target, and taking the PT coordinates as a first P coordinate and a first T coordinate; determining the horizontal included angle between the tracking target and a specified direction based on the first P coordinate; calculating the horizontal distance between the tracking target and the dome camera based on the first T coordinate and the height of the dome camera; calculating the distance in a longitude direction and the distance in a latitude direction between the tracking target and the dome camera through a trigonometric function based on the horizontal included angle and the horizontal distance; calculating the GPS coordinates of the tracking target based on the longitude and the latitude of the dome camera and the distance in the longitude direction and the distance in the latitude direction.

In this embodiment, the camera for shooting the tracking target is a dome camera, and the PT coordinates of the dome camera when shooting the tracking target may be converted into the GPS coordinates of the tracking target.

In this embodiment, through an electronic compass of the dome camera, a P coordinate for the dome camera when the dome camera is pointing in the specified direction may be obtained as a second P coordinate; and the difference between the first P coordinate and the second P coordinate is calculated and taken as the horizontal included angle between the tracking target and the specified direction.

Through the electronic compass of the dome camera, the P coordinate for the dome camera may be acquired when the dome camera is pointing in a direction of true north, true south, true east, true west and the like. In order to distinguish in the description, this P coordinate is called the second P coordinate. The difference between the first P coordinate and the second P coordinate is the horizontal included angle between the tracking target and the specified direction.

Figure 4:
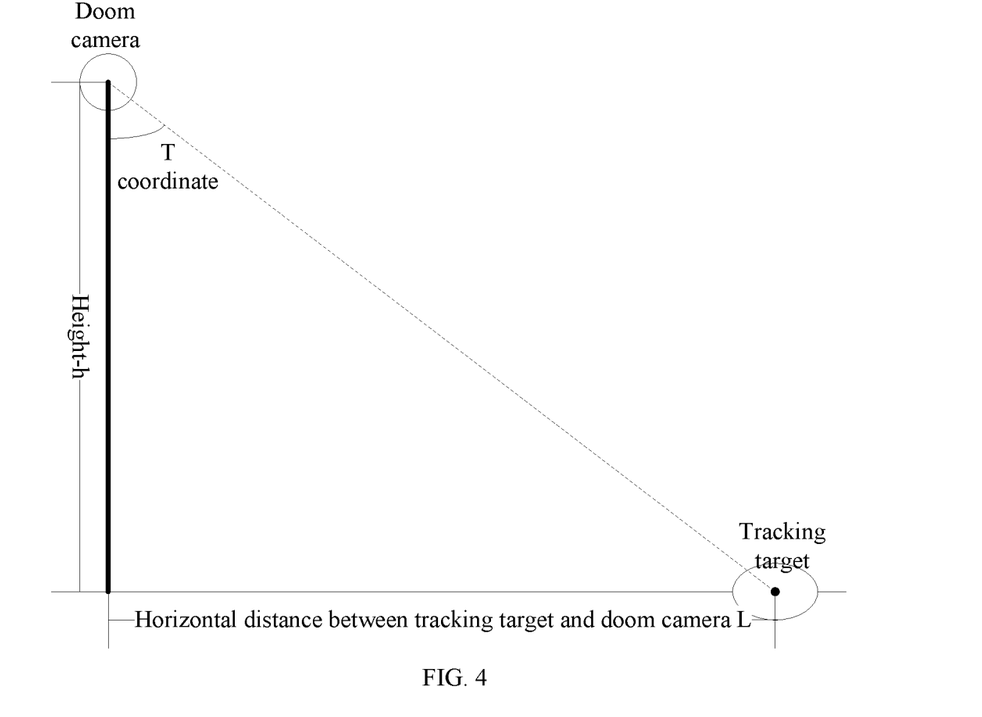
FIG. 4 is a schematic diagram illustrating a vertical direction coordinate conversion in an embodiment of the present application.

In this embodiment, a product of a tangent value of the first T coordinate and the height of the dome camera may be calculated as the horizontal distance between the tracking target and the dome camera. Referring to FIG. 4, tan T*h=L, h represents the height of the doom camera, and L represents the horizontal distance between the tracking target and the doom camera. The horizontal distance is the distance between the dome camera and the tracking target when assuming that the height of the doom camera and height of the tracking target are the same.

If the specified direction is true north, the product of a sine value of the horizontal included angle and the horizontal distance may be calculated and used as the distance in longitude direction between the tracking target and the dome camera; the product of a cosine value of the horizontal included angle and the horizontal distance is calculated and taken as the distance in the latitude direction between the tracking target and the dome camera.

Figure 5:
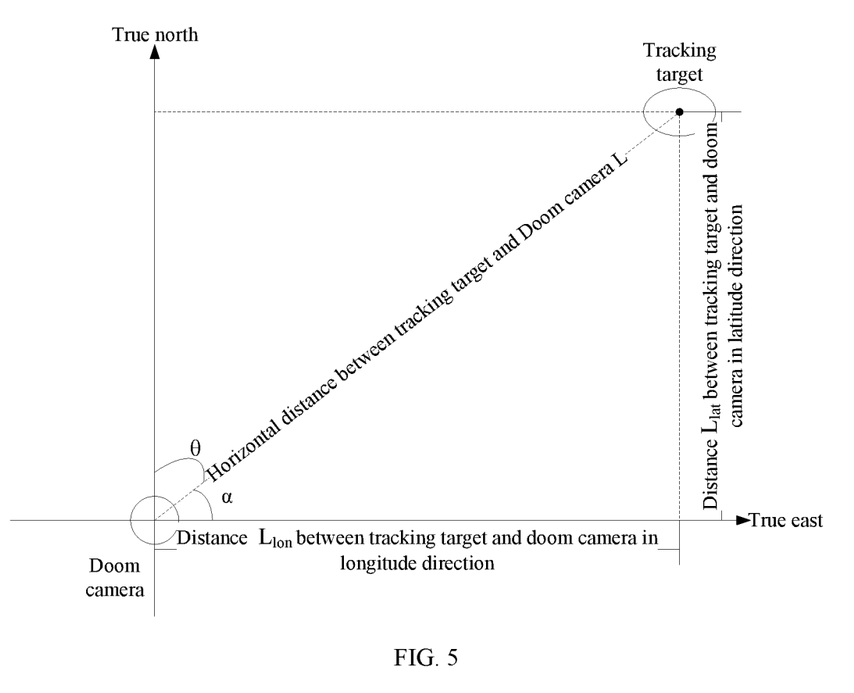
FIG. 5 is a schematic diagram illustrating a horizontal direction coordinate conversion in an embodiment of the present application.

Referring to FIG. 5, FIG. 5 is a top view of the doom camera, and FIG. 5 does not reflect the height of the dome camera. It can be seen from FIG. 5 that L*sin θ=$L_{lon}$, L*cos θ=$L_{lat}$, L represents the horizontal distance calculated above, θ represents the horizontal included angle between the tracking target obtained above and the true north direction, and $L_{lon}$ represents the distance in the longitude distance between the tracking target and the doom camera, and $L_{lat}$ represents the distance in the latitude direction between the tracking target and the doom camera.

If the specified direction is true east, the product of a cosine value of the horizontal included angle and the horizontal distance may be calculated and used as the distance in the longitude direction between the tracking target and the dome camera; the product of a sine value of the horizontal included angle and the horizontal distance is calculated and taken as the distance in the latitude direction between the tracking target and the dome camera.

In this case, the horizontal included angle between the tracking target and the true east direction is α in FIG. 5, L*sin α=$L_{lon}$, L*cos α=$L_{lat}$.

Or, the specified direction may be true west or true south, and the specific calculation process is similar, and will not be repeated here.

The dome camera usually has a GPS positioning apparatus, and the GPS coordinates of the dome camera may be acquired based on the GPS positioning apparatus. The GPS coordinates include latitude and longitude. In this way, the longitude and the latitude of the dome camera and the distances in the longitude direction and in the latitude direction between the doom camera and the tracking target are obtained, and the longitude and the latitude of the tracking target can be calculated, and the GPS coordinates of the tracking target can be obtained.

At step S102, for each pre-divided region, the number of tracking targets located in the region is counted based on the acquired GPS coordinates of each tracking target.

A monitoring region covered by cameras managed by a server is divided in advance. For example, it may be divided according to administrative region, or it may be divided according to geographical location, and the specific division method is not limited. For example, it is assumed that cameras managed by the server cover a city A, which includes 6 administrative regions, the number of tracking targets located in the 6 administrative regions may be counted for each of the 6 administrative regions based on the acquired GPS coordinates of each tracking target.

In an embodiment, a time stamp for the GPS coordinates of each tracking target may further be acquired. In this case, S102 may include: counting the number of the tracking targets located in the region during each time period based on the acquired GPS coordinates of each tracking target and the time stamp for the acquired GPS coordinates of each tracking target.

As mentioned above, the server may receive a data packet sent by each camera, which includes the GPS coordinates of each tracking target. In one case, the data packet may further include the time stamp for the GPS coordinates of each tracking target. In this way, the time dimension is added for the overall planning of the tracking target. For a region, the number of tracking targets during each time period may be counted.

At step S103, a heat map of the tracking targets is generated based on the number of the tracking targets in each region.

Figure 6:
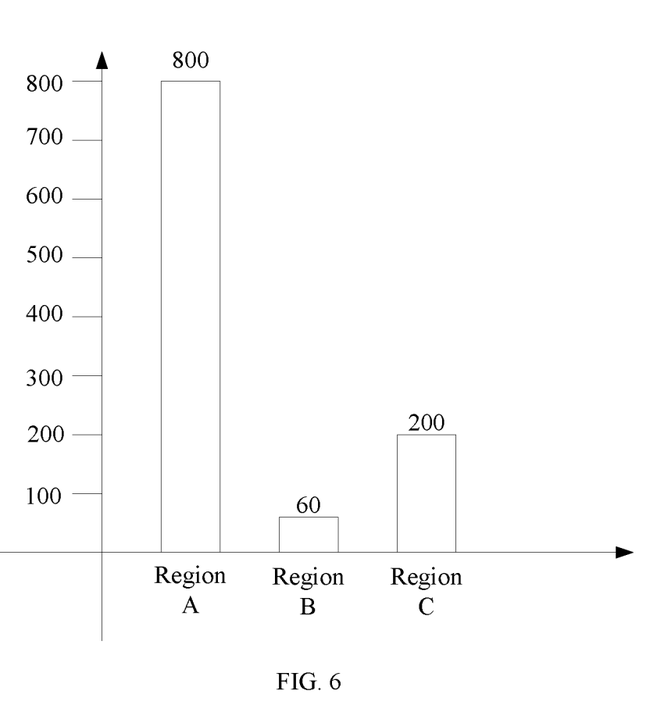
FIG. 6 is a schematic diagram of a heat map according to an embodiment of the present application.

In one case, referring to FIG. 6, the heat map may include the number of the tracking targets in each region. In FIG. 6, the number of tracking targets in region A is 800, the number of tracking targets in region B is 60, and the number of tracking targets in region C is 200. FIG. 6 is only an example, and does not limit the embodiments of the present application.

In the foregoing embodiment, a time stamp for the GPS coordinates of each tracking target is acquired, and the number of tracking targets located in each region during each time period is counted. In this case, S103 may include: generating a heat map of the tracking targets based on the number of the tracking targets in each region during each time period.

Figure 7:
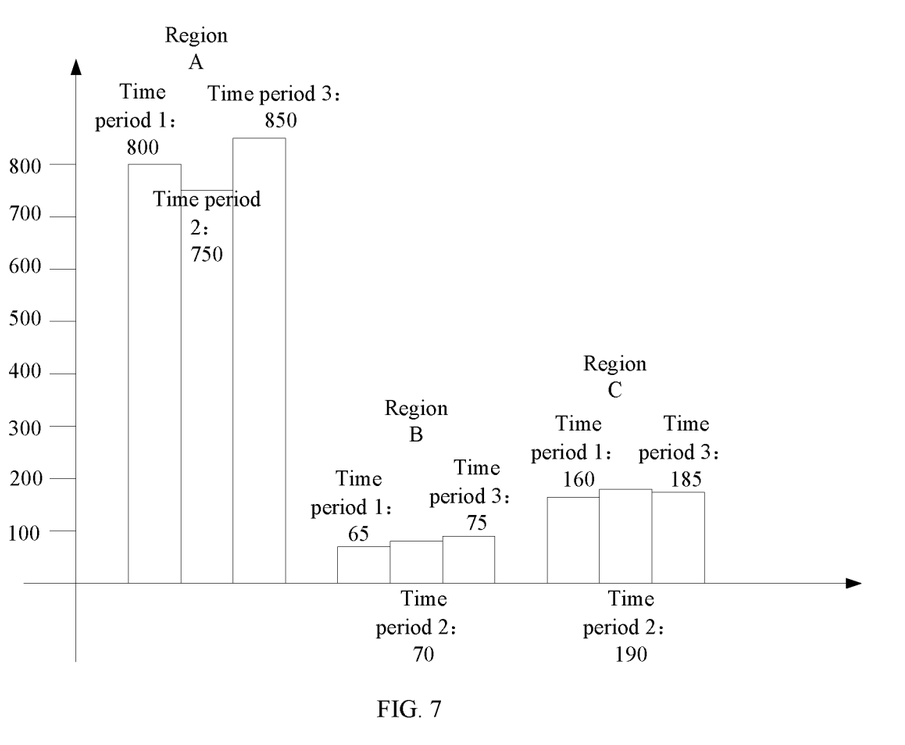
FIG. 7 is a schematic diagram of a further heat map according to an embodiment of the present application.

In this embodiment, referring to FIG. 7, the heat map may include the number of the tracking targets in each region during each time period. In FIG. 7, in region A, the number of the tracking targets during time period 1 is 800, the number of the tracking targets during time period 2 is 750, and the number of the tracking targets during time period 3 is 850. In region B, the number of the tracking targets during time period 1 is 65, the number of the tracking targets during time period 2 is 70, and the number of the tracking targets during time period 3 is 75; In region C, the number of the tracking targets during time period 1 is 160, the number of the tracking targets during time period 2 is 190, and the number of the tracking targets during time period 3 is 185. FIG. 7 is only an example, and does not limit the embodiments of the present application.

In another embodiment, attribute information of each tracking target may further be acquired. In this way, S103 may include: generating a heat map of the tracking targets, which includes the number of the tracking targets in each region and the attribute information of each tracking target.

For example, if the tracking target is a vehicle target, the attribute information may be a license plate number or an image including the vehicle target. If the tracking target is a human target, the attribute information may be a person's name, ID number, or face image, etc. The specific content of the attribute information is not limited.

In one case, the attribute information of the tracking target may be superimposed and displayed in the heat map. In other words, the attribute information of the tracking target may be displayed in a corresponding position in the heat map. In another case, the heat map may include two parts, wherein one part displays the number of the tracking targets in each region, and the other part displays the attribute information of each tracking target. The specific display method is not limited.

In an embodiment, the acquired GPS coordinates of each tracking target are converted into coordinates in a panoramic image according to a predetermined conversion relationship between the GPS coordinate system and a panoramic image coordinate system. The panoramic image includes each region; each tracking target is superimposed and displayed in the panoramic image acquired in advance based on the converted coordinates in the panoramic image.

The panoramic image may be a map including each region, or may be an image captured by a panoramic camera covering each region, or may be an image acquired by stitching the monitoring images captured by cameras in each region, which is not specifically limited. In other words, the panoramic image may cover each region that is obtained by dividing the monitoring regions covered by each camera managed by the server in advance.

For example, the panoramic image may be captured by one panoramic camera. Alternatively, monitoring images in each region may be captured by the cameras managed by the server, and these monitoring images are stitched to obtain the panoramic image.

A conversion relationship between the obtained GPS coordinate system and the coordinate system of the panoramic image is obtained in advance through calibration. In this way, the GPS coordinates of a tracking target may be converted into coordinates in the panoramic image. For example, it is assumed that GPS coordinates of a tracking target A are converted to obtain coordinates (X1, Y1) in a panoramic image, the tracking target A is displayed at the coordinates (X1, Y1) in the panoramic image.

For example, an identifier of the tracking target A may be displayed at the coordinates (X1, Y1) in the panoramic image. Alternatively, in the above embodiment, attribute information of each tracking target is acquired. In this case, the attribute information of the tracking target A may be displayed at the coordinates (X1, Y1) in the panoramic image.

In an embodiment, S103 may include: for each pre-divided region, determining a color for the region based on the number of the tracking targets located in the region; generating a heat map of the tracking targets, which includes the number of the tracking targets in each region, wherein the number of the tracking targets in each region is displayed in the color for the region.

For example, the number of the tracking targets may be divided into levels, for example, 0-50 is level 1, 51-100 is level 2, 101-150 is level 3 . . . and so on, and will not be listed one by one. Color for each level may set, for example, the color for level 1 is blue, the color for level 2 is green, the color for level 3 is yellow, and so on. The level classification and color setting may be carried out according to the user's choice or actual needs.

In one case, a region with a large number of the tracking targets may correspond to a more eye-catching color, such as red, to remind relevant personnel to pay attention.

In one embodiment, after S103, the method may further include: if the number of the tracking targets located in the region is greater than a first preset threshold, increasing any one or more of the following parameters of the camera monitoring the region: resolution, a bit rate, a frame rate, and an encoding rate.

In this embodiment, if there are a large number of the tracking targets in a certain region, the resolution, bit rate, frame rate, encoding rate and other parameters of the camera monitoring the region may be increased to increase the monitoring intensity of the region and acquire the detail information of the region.

In one embodiment, after S103, the method may further include: if the number of the tracking targets located in the region is less than a second preset threshold, decreasing any one or more of the following parameters of the camera monitoring the region: resolution, a bit rate, a frame rate, and an encoding rate.

The second preset threshold is less than the first preset threshold. In this embodiment, if the number of the tracking targets in a certain region is small, the resolution, bit rate, frame rate, encoding rate and other parameters of the camera monitoring the region may be decreased to decrease the monitoring intensity of the region and save the resource consumption of the camera.

If the number of the tracking targets in the region is not less than the second preset threshold and not greater than the first preset threshold, any one or more of the following parameters of the camera monitoring the region may be kept unchanged: resolution, a bit rate, a frame rate, and an encoding rate.

In an embodiment, after S103, the method may further include: if the number of the tracking targets located in the region is greater than a third preset threshold, detecting the monitoring images captured by the cameras in the region to determine whether an abnormal event has occurred; and if the abnormal event has occurred, outputting an alarm message.

The third preset threshold and the first preset threshold may be the same or different, and their specific values are not limited. It can be understood that if there are a large number of the tracking targets in a certain region, it means that abnormal events such as traffic accidents, traffic jams, or mass incidents may have occurred in the region. In this embodiment, if there are a large number of the tracking targets in a certain region, the monitoring images captured by the cameras in the region are detected to determine whether an abnormal event has occurred, and if the abnormal event has occurred, the alarm message is output.

For example, the alarm message may be output in the form of displaying texts, or the alarm message may be output in the form of voice broadcast, or the alarm message may be output in the form of flashing lights. The specific form of outputting the alarm message is not limited.

In an embodiment, after S103, the method may further include: if the number of the tracking targets located in the region is greater than a fourth preset threshold, controlling the panoramic camera for this region to capture an image of the region; acquiring the panoramic image captured by the panoramic camera for the region.

The fourth preset threshold, the third preset threshold and the first preset threshold may be the same or different, and their specific values are not limited. If there are a large number of the tracking targets in a certain region, it means that abnormal events such as traffic accidents, traffic jams, or mass incidents may have occurred in the region. In this embodiment, one or more panoramic cameras may be provided in each region. If there are a large number of the tracking targets in a region, a panoramic camera for this region is controlled to capture the panoramic image of the region. Through the panoramic image, it is possible to know whether an abnormal event has occurred in the region in time, and to know the related situations of the abnormal event in time for subsequent processing.

In the above embodiment, the camera for shooting the tracking target is a dome camera, and the PT coordinates of the dome camera when the dome camera shoots the tracking target are converted into the GPS coordinates of the tracking target.

In this embodiment, acquiring the PT coordinates of the dome camera when the dome camera shoots the tracking target, and taking the PT coordinates as a first P coordinate and a first T coordinate, may include:

acquiring the image coordinates of the tracking target in the image captured by the dome camera; determining the PT coordinates of the dome camera when the dome camera is facing the tracking target based on the image and a field of view when the dome camera shoots the tracking target, and taking the PT coordinates as the first P coordinate and the first T coordinate.

It is assumed that the image coordinates of the tracking target in the image captured by the dome camera are (X, Y), the following formula may be used to convert and obtain the first P coordinate and the first T coordinate:

$$Pan\_tar=Pan\_cur+\arctan((2*X/L_1-1)*\tan(\theta_1/2));$$

$$Tilt\_tar=Tilt\_cur+\arctan((2*Y/L_2-1)*\tan(\theta_2/2)).$$

Wherein, Pan_tar represents the first P coordinate, Tilt_tar represents the first T coordinate, Pan_cur represents a horizontal direction angle of the current dome camera in the PT coordinate system, Tilt_cur represents a vertical direction angle of the current dome camera in the PT coordinate system, (Pan_cur, Tilt_cur) corresponds to the position of the center of the current image, $L_1$ represents the total number of pixels in the horizontal direction of the image, $L_2$ represents the total number of pixels in the vertical direction of the image, $\theta_1$ is a horizontal field of view for the current image, and $\theta_2$ is a vertical field of view for the current image; and the XY coordinate system takes the upper left corner of the image as the origin and is measured in pixels.

Referring to FIGS. 4 and 5, it can be seen that if the dome camera is facing the tracking target, the obtained GPS coordinates of the tracking target are more accurate. The first P coordinate and the first T coordinate obtained by applying this embodiment are the PT coordinates of the dome camera when facing the tracking target. Therefore, by using this embodiment, more accurate GPS coordinates can be obtained.

In addition, in this embodiment, the method may further include: sending the first P coordinate and the first T coordinate to the doom camera; acquiring a monitoring image captured by the camera after the dome camera adjusts its own shooting angle according to the first P coordinate and the first T coordinate.

As mentioned above, the first P coordinate and the first T coordinate are the PT coordinates of the dome camera when facing the tracking target. The first P coordinate and the first T coordinate are sent to the dome camera. The dome camera adjusts its shooting angle according to the first P coordinate and the first T coordinate, captures a monitoring image for the tracking target after adjustment, and sends the monitoring image to the server. In this way, the server can acquire an image when facing the tracking target, so that relevant personnel can learn relevant information based on the image.

For example, it is assumed that the tracking target is a hit-and-run vehicle target. By applying this embodiment, the dome camera can capture a monitoring image including the license plate of the vehicle target when facing the vehicle target, and send the monitoring image to the server. Related personnel can obtain the license plate information of the hit-and-run vehicle.

In the embodiments of this application, GPS coordinates of each tracking target are acquired; for each pre-divided region, the number of tracking targets located in the region is counted based on the acquired GPS coordinates of each tracking target; and a heat map of the tracking targets is generated based on the number of the tracking targets in each region. It can be seen in the present solution, the heat map is generated based on the GPS coordinates of each tracking target, and the heat map can reflect the number of the tracking targets in each region, thus achieving the overall planning of the tracking targets.

Figure 8:
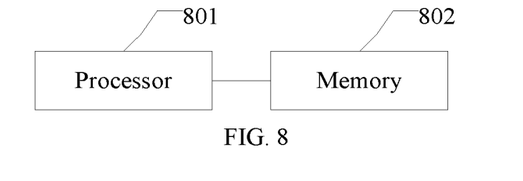
FIG. 8 is a schematic structural diagram of a camera according to an embodiment of the present application.

An embodiment of the present application further provides a camera, as shown in FIG. 8, including a processor 801 and a memory 802.

Wherein the memory 802 is configured for storing computer programs; and the processor 801 is configured for implementing any one of the GPS coordinates-based target overall planning methods when executing the programs stored in the memory 802.

In the embodiment of this application, GPS coordinates of each tracking target are acquired; for each pre-divided region, the number of tracking targets located in the region is counted based on the acquired GPS coordinates of each tracking target; and a heat map of the tracking targets is generated based on the number of the tracking targets in each region. It can be seen in the present solution, the heat map is generated by a device based on the GPS coordinates of each tracking target, and the heat map can reflect the number of the tracking targets in each region, thus achieving the overall planning of the tracking targets.

The memory may include a Random Access Memory (RAM), or may include a Non-Volatile Memory (NVM), for example at least one disk memory. In an embodiment, the memory may also be at least one storage device located away from the processor described above.

The processor may be a general-purpose processor, such as a Central Processing Unit (CPU), a Network Processor (NP), or the like. It may also be a Digital Signal Processor (DSP), an Application Specific Integrated Circuit (ASIC), a Field-Programmable Gate Array (FPGA) or other programmable logic device, a discrete gate or transistor logic device, a discrete hardware component.

It should be noted that the relationship terms herein such as "first", "second", and the like are only used for distinguishing one entity or operation from another entity or operation, but do not necessarily require or imply that there is any actual relationship or order between these entities or operations. Moreover, the terms "comprise", "include" or any other variants thereof are intended to cover non-exclusive inclusions, so that processes, methods, articles or devices including a series of elements include not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. Particularly, the embodiments of the camera are described briefly, since they are similar to the embodiments of the method, and for similar parts, one could refer to the corresponding description of the embodiments of the method.

The embodiments described above are merely preferred embodiments of the present application, and not intended to limit the scope of the present application. Any modifications, equivalents, improvements or the like within the spirit and principle of the application should be included in the scope of the application.

What is claimed is:

1. A GPS coordinates-based target overall planning method, comprising:
 acquiring GPS coordinates of each tracking target;
 for each pre-divided region, counting the number of tracking targets located in the region based on the acquired GPS coordinates of each tracking target; and
 generating a heat map of the tracking targets based on the number of the tracking targets in each region;
 wherein acquiring the GPS coordinates of each tracking target comprises:
 receiving a monitoring image sent by each camera, identifying the tracking target in the monitoring image, and converting coordinates of the tracking target from a coordinate system of the monitoring image into the GPS coordinates;
 or, receiving a data packet sent by each camera, wherein the data packet comprises the GPS coordinates of each tracking target.

2. The method according to claim 1, wherein converting the coordinates of the tracking target from the coordinate system of the monitoring image into the GPS coordinates comprises:
 selecting, from preset calibration point groups, a calibration point group whose distance to the tracking target meets a preset distance condition, as a target calibration point group; and
 converting the coordinates of the tracking target from the coordinate system of the monitoring image into the GPS coordinates based on a homography matrix, acquired in advance through calibration, for the target calibration point group.

3. The method according to claim 1, wherein acquiring the GPS coordinates of each tracking target comprises:
 acquiring PT coordinates of a dome camera when the dome camera shoots the tracking target, and taking the PT coordinates as a first P coordinate and a first T coordinate;
 determining a horizontal included angle between the tracking target and a specified direction based on the first P coordinate;
 calculating a horizontal distance between the tracking target and the dome camera based on the first T coordinate and a height of the dome camera;
 calculating a distance in a longitude direction and a distance in a latitude direction between the tracking target and the dome camera through a trigonometric function based on the horizontal included angle and the horizontal distance; and
 calculating the GPS coordinates of the tracking target based on a longitude and a latitude of the dome camera and the distance in the longitude direction and the distance in the latitude direction.

4. The method according to claim 3, wherein acquiring the PT coordinates of the dome camera when the dome camera shoots the tracking target, and taking the PT coordinates as the first P coordinate and the first T coordinate, comprises:
 acquiring image coordinates of the tracking target in an image captured by the dome camera; and
 determining the PT coordinates of the dome camera when the dome camera is facing the tracking target based on the image coordinates and a field of view of the dome camera when the dome camera shoots the tracking target, and taking the PT coordinates as the first P coordinate and the first T coordinate;
 wherein the method further comprises:
 sending the first P coordinate and the first T coordinate to the doom camera; and
 acquiring a monitoring image captured by the dome camera after a shooting angle of the dome camera is adjusted according to the first P coordinate and the first T coordinate.

5. The method according to claim 1, further comprising:
 acquiring a time stamp for the GPS coordinates of each tracking target;
 counting the number of the tracking targets located in the region based on the acquired GPS coordinates of each tracking target, comprises:
 counting the number of the tracking targets located in the region during each time period based on the acquired GPS coordinates of each tracking target and the time stamp for the acquired GPS coordinates of each tracking target; and
 generating the heat map of the tracking targets based on the number of the tracking targets in each region, comprises:
 generating the heat map of the tracking targets based on the number of the tracking targets in each region during each time period.

6. The method according to claim 1, further comprising:
 acquiring attribute information of each tracking target;
 generating the heat map of the tracking targets based on the number of the tracking targets in each region, comprises:
 generating the heat map of the tracking targets, wherein the heat map comprises the number of the tracking targets in each region and the attribute information of each tracking target.

7. The method according to claim 1, further comprising:
 converting the acquired GPS coordinates of each tracking target into coordinates in a panoramic image according to a predetermined conversion relationship between a GPS coordinate system and a coordinate system of the panoramic image; wherein the panoramic image comprises each region; and
 superimposing and displaying each tracking target in the panoramic image acquired in advance based on the converted coordinates in the panoramic image.

8. The method according to claim 7, wherein the panoramic image is a map including each region, or an image captured by a panoramic camera covering each region, or an image acquired by stitching monitoring images captured by cameras in each region.

9. The method according to claim 1, wherein generating the heat map of the tracking targets based on the number of the tracking targets in each region, comprises:
 for each pre-divided region, determining a color for the region based on the number of the tracking targets located in the region; and
 generating the heat map of the tracking targets, wherein the heat map includes the number of the tracking targets in each region, wherein the number of the tracking targets in each region is displayed in the color for the region.

10. The method according to claim 1, wherein after counting, for each pre-divided region, the number of the tracking targets located in the region based on the acquired GPS coordinates of each tracking target, the method further comprises:

if the number of the tracking targets located in the region is greater than a first preset threshold, increasing any one or more of the following parameters of a camera monitoring the region: resolution, a bit rate, a frame rate, and an encoding rate;

and/or, if the number of the tracking targets located in the region is less than a second preset threshold, decreasing any one or more of the following parameters of the camera monitoring the region: resolution, a bit rate, a frame rate, and an encoding rate.

11. The method according to claim 1, wherein after counting, for each pre-divided region, the number of the tracking targets located in the region based on the acquired GPS coordinates of each tracking target, the method further comprises:

if the number of the tracking targets located in the region is greater than a third preset threshold, detecting monitoring images captured by cameras in the region to determine whether an abnormal event has occurred; and if the abnormal event has occurred, outputting an alarm message.

12. The method according to claim 1, wherein after counting, for each pre-divided region, the number of the tracking targets located in the region based on the acquired GPS coordinates of each tracking target, the method further comprises:

if the number of the tracking targets located in the region is greater than a fourth preset threshold, controlling a panoramic camera for the region to capture an image of the region; and acquiring a panoramic image captured by the panoramic camera for the region.

13. A camera comprising a processor and a memory;

wherein the memory is configured for storing computer programs;

the processor is configured for implementing steps of the method according to claim 1 when executing the programs stored on the memory.

* * * * *